US012628803B2

(12) United States Patent
Magnuson

(10) Patent No.: US 12,628,803 B2
(45) Date of Patent: May 19, 2026

(54) FISHING LURE WITH BAIT CHAMBER

(71) Applicant: Yakima Bait Co., Granger, WA (US)

(72) Inventor: Shane P. Magnuson, Granger, WA (US)

(73) Assignee: Yakima Bait Co., Granger, WA (US)

( * ) Notice: Subject to any disclaimer, the term of this patent is extended or adjusted under 35 U.S.C. 154(b) by 0 days.

(21) Appl. No.: 18/907,382

(22) Filed: Oct. 4, 2024

(65) Prior Publication Data

US 2026/0096545 A1 Apr. 9, 2026

(51) Int. Cl.
A01K 85/01 (2006.01)
A01K 85/00 (2006.01)
A01K 85/18 (2006.01)

(52) U.S. Cl.
CPC .......... A01K 85/018 (2022.02); A01K 85/017 (2022.02); A01K 85/18 (2013.01); A01K 85/1847 (2022.02); A01K 85/1851 (2022.02)

(58) Field of Classification Search
CPC .............. A01K 85/018; A01K 85/1847; A01K 85/1851; A01K 85/18
USPC ....................................................... 43/42.06
See application file for complete search history.

(56) References Cited

U.S. PATENT DOCUMENTS

| | | | |
|---|---|---|---|
| 1,885,440 A | 11/1932 | Hendrick | |
| 1,890,400 A | 12/1932 | Miller | |
| D106,060 S | 9/1937 | Raymond | |
| D152,295 S | 1/1949 | Simun | |
| 2,923,084 A | 2/1960 | Newman | |
| 2,994,982 A * | 8/1961 | Murawski | A01K 85/02 |
| | | | 43/42.35 |
| 3,135,065 A | 6/1964 | Cromoga | |
| D260,549 S | 9/1981 | Lee | |
| D281,897 S | 12/1985 | Braathen | |
| 4,700,503 A | 10/1987 | Pippert | |
| 4,777,757 A * | 10/1988 | de Marees van Swinderen .......... | |
| | | | A01K 85/01 |
| | | | D22/128 |
| 5,172,510 A * | 12/1992 | Lovell, Jr. .............. | A01K 85/01 |
| | | | 43/42.36 |
| D374,907 S | 10/1996 | Ketchum | |
| 5,603,182 A * | 2/1997 | Wilson .................... | A01K 85/01 |
| | | | 43/44.99 |
| D414,837 S | 10/1999 | Galvan | |
| 6,588,138 B1 * | 7/2003 | Gilbert .................... | A01K 85/01 |
| | | | 43/42 |

(Continued)

OTHER PUBLICATIONS

Brads, posted Mar. 1, 2013 [online], [retrieved Jul. 29, 2025]. Retrieved from internet, https://www.amazon.com/Brads-2Pk-Super-Cut-Plug/dp/B00C508RDU (Date:2025) (Year: 2013).

(Continued)

*Primary Examiner* — Christopher P Ellis
(74) *Attorney, Agent, or Firm* — Cozen O'Connor

(57) ABSTRACT

Disclosed herein are a fishing lure and method of assembly thereof. Specifically, embodiments of a fishing lure are disclosed that include a head portion and a tail portion that are couplable to form a bait chamber. The fishing lure is attachable to a leader via a passage formed by the fishing lure that remains within the chamber from a first hole formed in the head portion to a second hole formed in the tail portion. The second hole is formed in a surface of the tail portion that is closer to the first hole of the head portion than a second end surface of the tail portion.

19 Claims, 10 Drawing Sheets

(56) References Cited

U.S. PATENT DOCUMENTS

| | | | |
|---|---|---|---|
| 7,174,669 B1 * | 2/2007 | Kallas ................... | A01K 85/01 |
| | | | 43/42.23 |
| D635,636 S | 4/2011 | Bekkala | |
| 8,474,174 B2 | 7/2013 | Norman | |
| 9,044,000 B1 * | 6/2015 | Lumsden ............... | A01K 83/06 |
| 9,770,015 B2 | 9/2017 | Slocum | |
| 10,206,385 B2 * | 2/2019 | Preller, Jr. ............. | A01K 97/12 |
| D849,880 S | 5/2019 | Naig | |
| D858,687 S | 9/2019 | Laroy | |

OTHER PUBLICATIONS

Ex Parte Quayle Action issued for U.S. Appl. No. 29/966,843, filed Sep. 17, 2025, 7 pages,.
Hawken, posted unknown [online], [retrieved Jul. 29, 2025]. Retrieved from internet, https://www.multione.net/product-p-510466.html (Date:2025) (Year: 2025).
King, posted Jul. 24, 2022 [online], [retrieved Jul. 29, 2025]. Retrieved from internet, https://web.archive.org/web/20220724091039/ https://www.kingkandylures.com/ (Date:2025) (Year: 2022).
Yakima, posted Feb. 6, 2025 [online], [retrieved Jul. 29, 2025]. Retrieved from internet, https://www.facebook.com/yakimabaiUposts/ check-out-these-awesome-versions-of-our-new-cut-pl ug-painted-by-jarrod-kirkleywo/1018420360327049/ (Date:2025) (Year: 2025).
PCT Search Report and Written opinion from PCT Application No. PCT/US2025/049147 dated Nov. 18, 2025, 8 pages.

* cited by examiner

FISHING LURE WITH BAIT CHAMBER

BACKGROUND

The present invention relates to fishing equipment, and more particularly to an improved baited lure used when fishing to attract fish.

Lures for fishing generally are designed to attract the attention of particular fish, and may be designed to spin as they pass through the water. Each lure has a body that is attached to a fishing line via a leader. Also attached to the lure, or to the leader, is a fish hook that snares the fish in the mouth. Bait may be attached to the hook, so that the combination of the attractiveness of the lure and the scent from the bait brings the fish to "strike" the lure and/or bait and swallow the fish hook. The fish hook, due to its barbs, does not allow the fish to escape so that the fish may be reeled in by the user of the lure.

Some lures are hollow so that the bait may be inserted within a scent or bait chamber in the lure itself. These hollow lures often have two sections that are secured together by some type of locking device once the bait is inserted within the chamber of the lure. Holes in the body of the lure allow the scent of the bait to escape into the water from the chamber to further attract the fish. These lures are attached to the leader together with the fish hook, or the fish hook may be integral with a portion of the lure.

One such known baited lure 10 is shown in FIG. 1, including a main body 12 having a head portion 14 with a hole 16 extending therethrough. A leader 18 may extend through the hole 16 and connect to a fish hook (not shown). The main body 12 further includes a tail portion 20 opposite the head portion 14. The known baited lure 10 includes a hinged segment 22 coupled to the main body 12. When the known baited lure 10 is in the closed configuration, the hinged segment 22 may be secured relative to the main body 12 via some sort of snap device, such as a rubber band 24.

The known baited lure 10 is transitionable between a closed configuration in which the main body 12 and the hinged segment 22 form a closed interior cavity 26, and an open configuration in which the main body 12 and the hinged segment 22 form an opening into the interior cavity 26. In the open configuration (shown in FIG. 1) bait may be loaded into the interior cavity 26, and then the known baited lure 10 may be transitioned to the closed configuration capturing the bait within the interior cavity 26.

A protrusion 28 and a node 30 on the hinged segment 22 establish a path and connection for the leader 18 to hinged segment 22. The fish hook may alternatively be coupled to the leader 18 proximate the protrusion 26. If the leader 18 breaks for any reason while in the water, the known baited lure 10 may be lost. Additionally, having to "unlock" the hinged segment 22 from the main body 12 (e.g., via removal of the rubber band 24) to access the interior cavity 24 results in an increase in the time it takes to rebait the known baited lure 10.

Other known baited lures 40 are shown in FIGS. 2 and 3. The known baited lure 40 is shown having a tail section 42 and a head section 44. A fish hook (not shown) is attachable to a leader 46 at location beyond the tail section 42. The leader 46 is threaded through a first hole 48 in an end surface 50 of the tail section 42 and a second hole 52 on an underside of the tail section 42. The tail section 42 is hollow to form a bait/scent chamber 54 and has scent holes 56 that extend from an interior of the tail section 42 to an exterior (e.g., the surrounding environment) of the tail section 42.

The leader 46 then is threaded through one of two holes 58 in the head section 44 for attachment to a fishing line (not shown). The selected one of the two holes 58 for the leader 46 to pass through the head section 44 determines a spin direction for the known baited lure 40. The head section 44 also is hollow to form an air chamber 60 within which a rattle or noise making device may be inserted, or to form a larger bait/scent chamber for the bait or scent when connected with the tail section 42.

As an integral part of the head section 44, or as a separate piece, a press-fit connector 62 is formed to fit snugly between the tail section 42 and the head section 44 so that when the tail section 42 and the head section 44 are fitted together there is an interior chamber within which bait or scent may be placed. The press-fit connector 62 may be hollow, as shown in FIG. 2, to provide the larger bait scent chamber, or may be solid to form the air chamber 60 in the head section 44, as shown in FIG. 3. A tether 64 may be permanently attached between the tail section 42 and the head section 44 as shown in case the tail and head sections 42, 44 get separated, or the leader 46 is broken.

Both the known baited lure 10 and the known baited lure 40 include a portion of a leader positioned outside the respective baited lure to secure the respective baited lure to the respective leader. This exposed portion of the leader may be more susceptible to breakage, and may affect the spin characteristics or other performance of the respective known baited lure when traveling through water.

BRIEF SUMMARY

Embodiments described herein provide a fishing lure that includes a chamber that can secure bait and/or scent emitting media within the chamber during use of the fishing lure. Some embodiments include multiple portions (e.g., head and tail portions) that are separable to open/access the chamber and couplable to close the chamber trapping any bait and/or scent emitting media therewithin.

Some embodiments of the fishing lure described herein include separate head and tail portions that are couplable/decouplable via a single, linear movement of at least one of the head and tail portions relative to the other of the head and tail portions (e.g., a press-fit). The fishing lure may rely on a friction fit between the head and tail portions to maintain the fishing lure in a closed configuration during use. The avoidance of additional locking components (e.g., a rubber band, a release button, etc.) and more complicated relative movement (e.g., rotation, twisting, etc.) between the head and tail portions reduces the time it takes to transition the fishing lure from an open configuration to the closed configuration (e.g., when refilling the chamber with bait and/or scent emitting media).

Some embodiments of the fishing lure described herein are attachable to a leader via passage of the leader into the chamber through an entry hole in one of the head and tail portions, and out of the chamber through an exit hole in the other of the head and tail portions. The fishing lure defines a passage between the entry and exit hole that remains entirely within the chamber. Thus, no portion of the leader between the entry hole and the exit hole is positioned outside the chamber when the fishing lure is secured to the leader with the leader positioned within the passage.

Some embodiments of a fishing lure include a head portion and a tail portion. The head portion includes a first end surface and a first tubular sidewall extending away from the first end surface. The head portion further includes a head chamber at least partially defined by the first end surface and the first tubular sidewall. The tail portion includes a second end surface and a second tubular sidewall extending away from the second end surface. The tail portion further includes a tail chamber at least partially defined by the second end surface and the second tubular sidewall.

The head portion is selectively couplable to the tail portion to form a closed configuration in which the first portion and the second portion cooperatively form a lure chamber. In the closed configuration, the fishing lure defines a passage that enters the lure chamber through a first hole formed in the first end surface and exits the lure chamber through a second hole formed in the tail portion such that an entirety of the passage between the first hole and the second hole remains within the lure chamber. When in the closed configuration the second hole is closer to the head portion than the second hole is from the second end surface.

Some embodiments of a method of assembling a fishing lure include passing a leader through a first hole formed in a first surface of a head portion of the fishing lure, and passing the leader through a second hole formed in a second surface of a tail portion of the fishing lure. The method further includes moving at least one of the head portion and the tail portion relative to the other of the head portion and the tail portion in a singular, linear direction, while the leader extends through both the first hole and the second hole, to form a chamber defined by and enclosed within the head portion and the tail portion. Additionally, the method includes enclosing a portion of the leader within the chamber such that an entirety of a length of the leader between the first hole and the second hole is within the chamber. According to the method, the leader is secured to the fishing lure such that the leader is devoid of a portion outside the chamber between portions of the leader that are inside the chamber.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings. The headings and Abstract of the Disclosure provided herein are for convenience only and do not interpret the scope or meaning of the embodiments.

DETAILED DESCRIPTION

Figure 1:
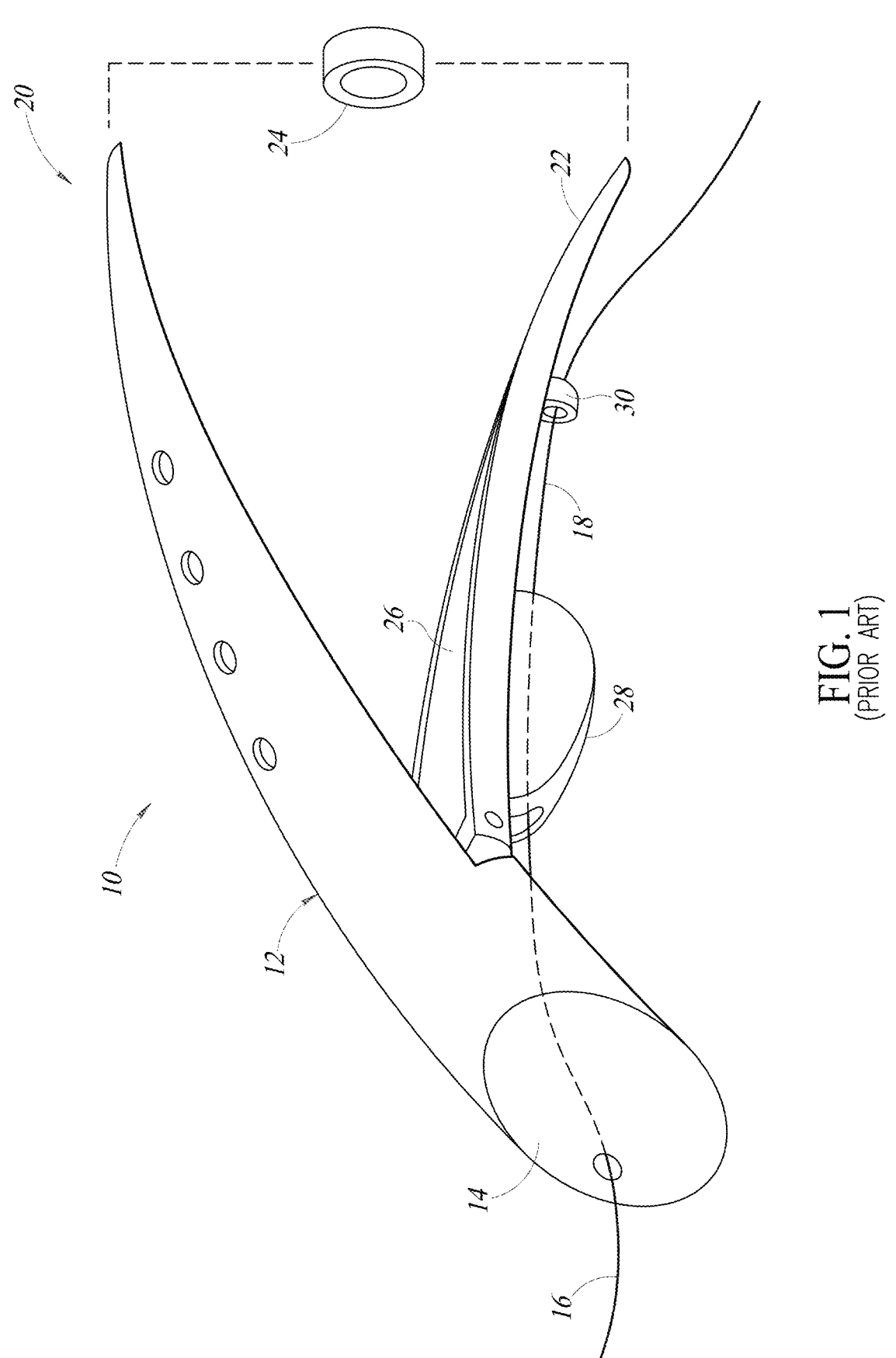
FIG. 1 is an isometric view of a known baited fishing lure with a hinged connection.
Figures 2, 3:
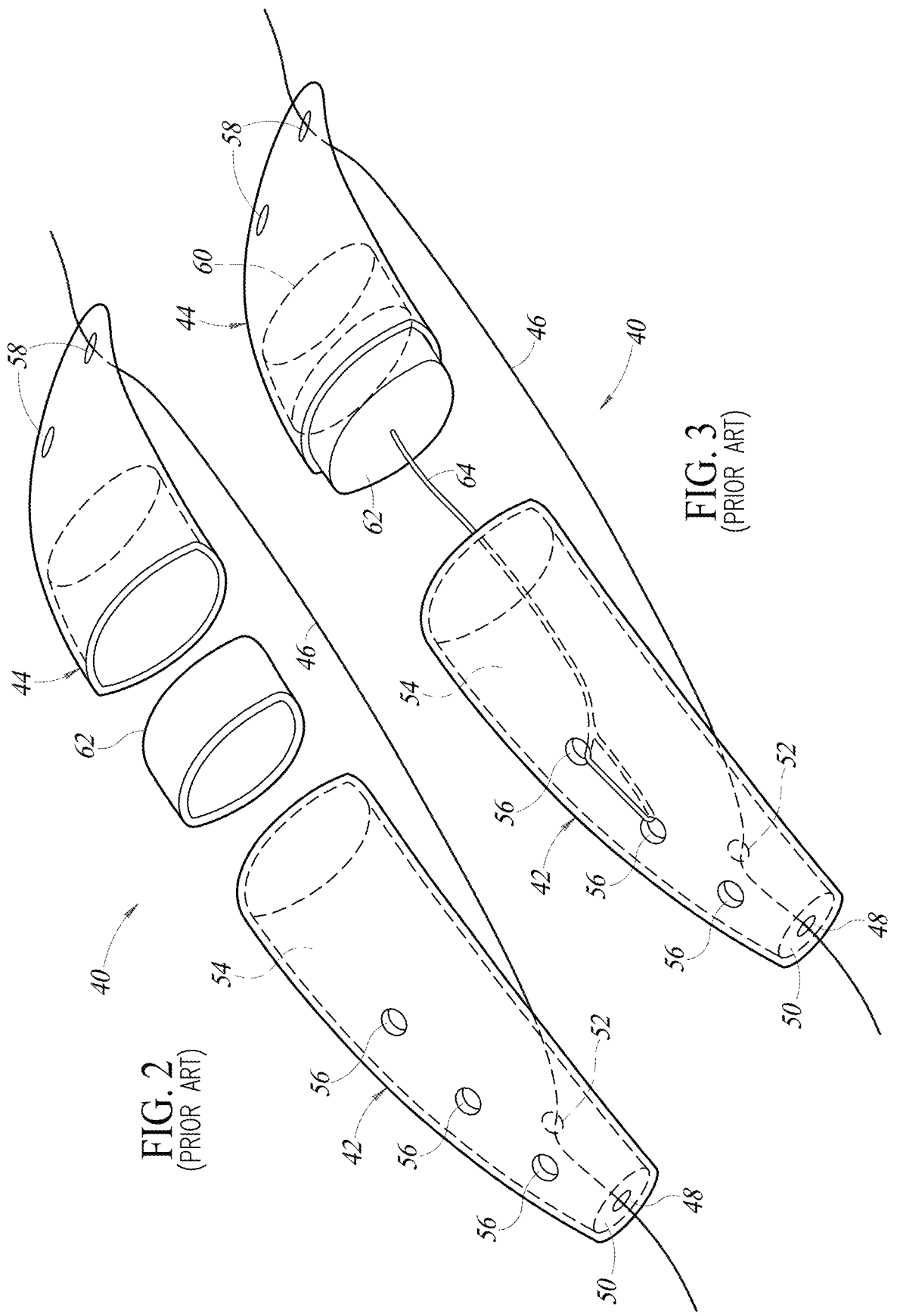
FIG. 2 is an isometric view of another known baited fishing lure with a hollow connector.
FIG. 3 is an isometric view of another known baited fishing lure with a solid connector.
Figure 4:
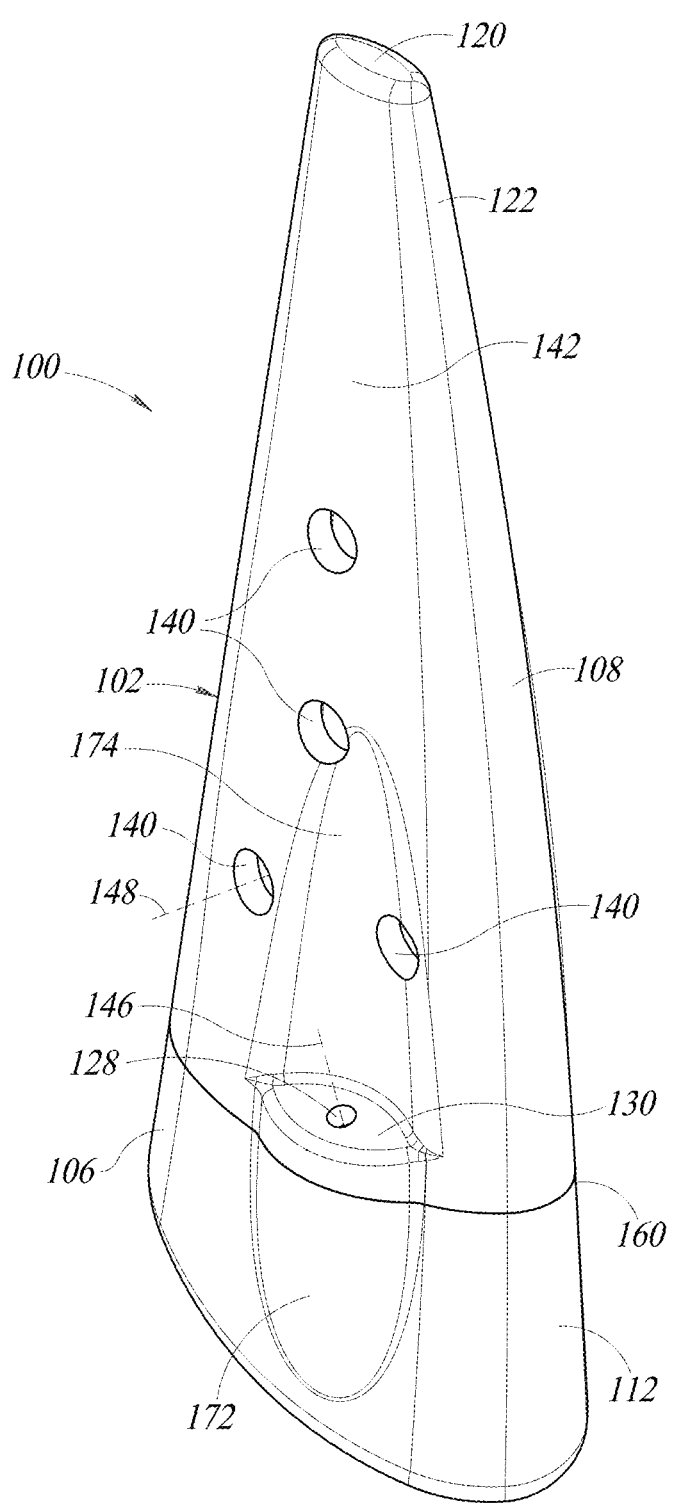
FIG. 4 is a front, right side, top, isometric view of a fishing lure shown in a closed configuration.
Figure 5:
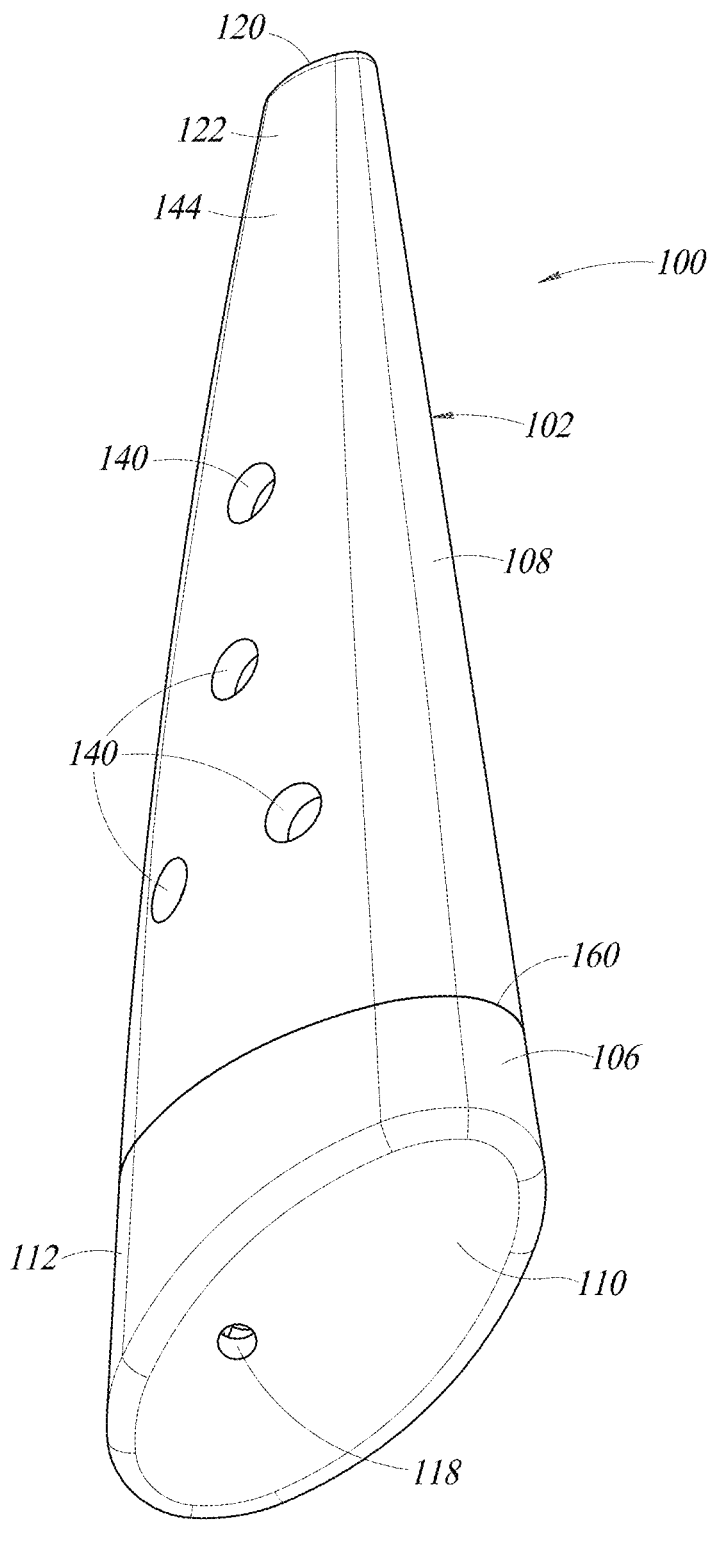
FIG. 5 is a rear, left side, bottom, isometric view of the fishing lure illustrated in FIG. 4.

As noted above, conventional fishing lures are known and utilized to enclose bait and/or scent emitting media. Some known fishing lures include separable portions that provide access to a chamber for the bait and/or scent emitting media in an open configuration. The portions are secured to one another to transition the known fishing lures to a closed configuration in which the bait and/or scent emitting media is trapped within the chamber. However, the separable pieces may be lost if a leader to which the fishing lure is attached, breaks. Embodiments of the fishing lure described herein comprise a head portion and a tail portion that are separable from one another in an open configuration providing access to a chamber, and couplable to one another in a closed configuration.

Some embodiments of the fishing lure are attachable to a leader such that, in the closed configuration, the leader passes through a first hole in the head portion, enters the chamber and remains within the chamber until exiting the fishing lure through a second hold in the tail portion. These embodiments may better protect the leader from damage (e.g., compared to fishing lures in which a portion of the leader that connects the head portion and the tail portion is exposed to the surrounding environment, such as water) and potential hazards therein.

Embodiments of the fishing lure may allow it a slower presentation with a different action. Action refers to spin rate, and the fishing lure disclosed herein may be able to perform and begin spinning at a slower speed than other known fishing lures. Additionally, the fishing lure may also have improved performance characteristics at higher speeds. For example, the fishing lure disclosed herein may inhibit a particular action in the tail portion referred to as a "tail kick." During a tail kick, the tail pauses for a moment to make the lure look as if it is a wounded bait fish when the lure is rolling over/spinning in the water.

Some embodiments of the fishing lure disclosed herein may begin spinning/rolling over at 0.8 mph, making it superior to others in the same category. At times it may be preferable to slow down presentation of the fishing lure to entice finicky fish or fish in very cold water to have time to react to the fishing lure, as the fish may be lethargic and not as willing to expend energy and bite. By making the fishing lure able to spin/roll over at much slower speeds than other known lures the angler/fisherman may have an advantage over others not using the same lure.

One of the components of the fishing lure that impacts the action of the fishing lure is the pull point (the portion/position of the fishing lure where the fishing line is attached). The pull point placement and/or the angles of the head and side surfaces of the fishing lure may influence the characteristics of the fishing lure, including but not limited to, speed tolerance (the lowest speed and the highest speed at which the fishing lure will exhibit the desired fish catching action), action (how the fishing lure "swims" or moves through the water), hook placement (relative position of the hook(s), which influences weight balance), as well as dive depth (how deep the fishing lure dives beneath the surface of the water).

In some embodiments of the fishing lure disclosed herein, a portion of the leader is protected by both the head portion and the tail portion, allowing the fishing lure to spin/roll around the leader more freely as there are less contact points. The leader may exit the tail portion through a side hole (e.g., halfway up a length of the lure body, or closer to the end surface of the head portion than the end surface of the tail portion). This position may result in a free spinning tail that has a tighter spin. Additionally, the fishing lure may rotate at slower speed in the water which may increase the attractiveness of the fishing lure to different types of fish.

Referring now to the drawings, and specifically to FIGS. 4 to 13, a fishing lure 100 may include a lure body 102 and a lure chamber 104. The lure body 102 may include a head portion 106 and a tail portion 108 that are selectively couplable/decouplable to transition the fishing lure 100 from a closed configuration (shown in FIGS. 4 to 10) to an open configuration (shown in FIGS. 11 to 13), and vice versa. In the open configuration, the lure chamber 104 is accessible (e.g., such that bait can be inserted within the lure chamber 104). In the closed configuration, the lure chamber 104 is closed such that bait therewithin is enclosed by the lure body 102, as described in further detail below.

Some embodiments of the head portion 106 may include a first end surface 110 and a first tubular sidewall 112 that extends from the first end surface 110. The head portion 106 may further include a head chamber 114 at least partially defined by the first end surface 110 and the first tubular sidewall 112. As shown, the head portion 106 may include a head opening 116 (e.g., defined by the first tubular sidewall 112) that is opposite the first end surface 110. In the open configuration, the head chamber 114 may be accessible (e.g., loaded with bait) via passage through the head opening 116, and in the closed configuration, the head chamber 114 may be blocked (e.g., by the tail portion 108), as described in further detail below.

The head portion 106 may further include a first hole 118 that defines a passage through the head portion 106 of the lure body 102 and into the head chamber 114 from a surrounding environment (e.g., a body of water) of the fishing lure 100. The first hole 118 may be positioned (e.g., formed in the first end surface 110) such that the passage defined by the first hole 118 is open/unblocked in both the open configuration and the closed configuration.

Some embodiments of the tail portion 108 may include a second end surface 120 and a second tubular sidewall 122 that extends from the second end surface 120. The tail portion 108 may further include a tail chamber 124 at least partially defined by the second end surface 120 and the second tubular sidewall 122. As shown, the tail portion 108 may include a tail opening 126 (e.g., defined by the second tubular sidewall 122) that is opposite the second end surface 120. In the open configuration, the tail chamber 124 may be accessible (e.g., loaded with bait) via passage through the tail opening 126, and in the closed configuration, the tail chamber 124 may be blocked (e.g., by the head portion 106), as described in further detail below.

The tail portion 108 may further include a second hole 128 that defines a passage through the tail portion 108 of the lure body 102 and into the tail chamber 124 from the surrounding environment of the fishing lure 100. The second hole 128 may be positioned (e.g., formed in an intermediate surface 130) such that the passage defined by the second hole 128 is open/unblocked in both the open configuration and the closed configuration.

Figure 10:
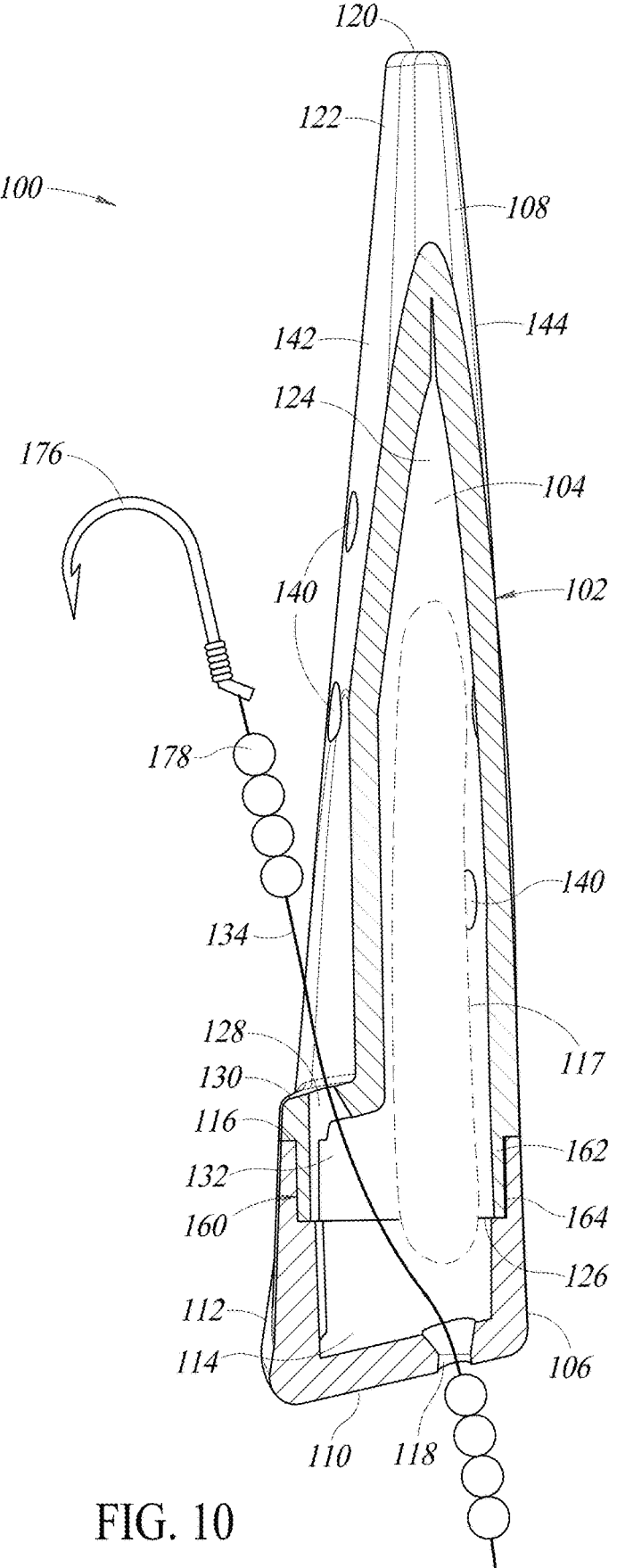
FIG. 10 is a side, cross-sectional view of the fishing lure illustrated in FIG. 9, taken along line 10-10.
Figure 11:
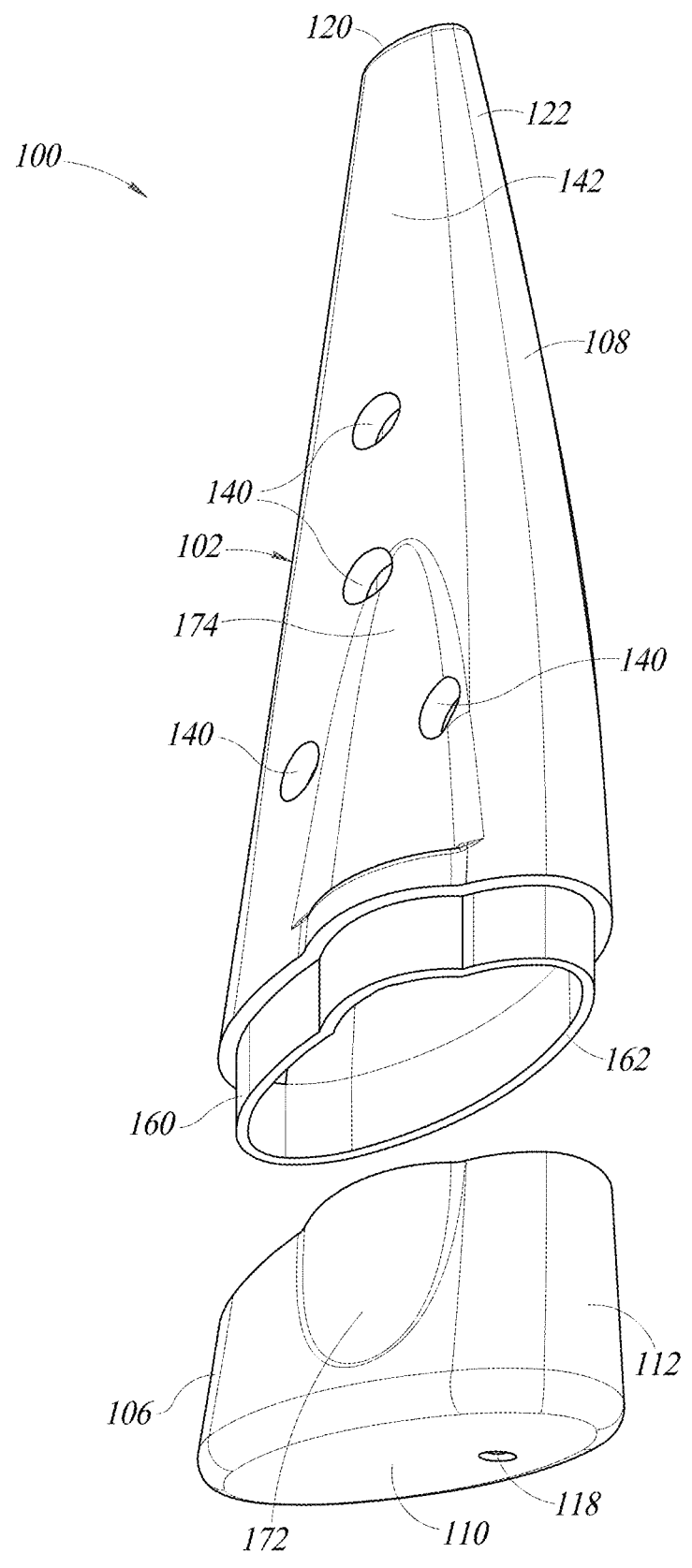
FIG. 11 is a front, right side, top, isometric view of the fishing lure illustrated in FIG. 1, shown in an open configuration.

In the closed configuration, the head portion 106 may be selectively couplable to the tail portion 108 such that the head chamber 114 and the tail chamber cooperatively form the lure chamber 104, which is cooperatively enclosed by the head portion 106 and the tail portion 108. As shown in FIG. 10, in the closed configuration the fishing lure 100 may define a passage 132 that enters the lure chamber 104 (e.g., through the first hole 118 formed in the first end surface 110) and remains within the lure chamber 104 until exiting (e.g., through the second hole 128 formed in the intermediate surface 130). Thus, a line (e.g., a leader 134) that passes through respective holes of both the head portion 106 and the tail portion 108 (e.g., the first hole 118 and the second hole 128, respectively) may include a length (e.g., between the first hole 118 and the second hole 128) that is entirely within the lure chamber 104.

As shown, the fishing lure 100 may be elongate along a first direction D1, along which the fishing lure 100 defines a length J1. In the closed configuration, the second hole 128 may be distanced from the head portion 106 by a second length J2, and the second hole 128 may be distanced from the second end surface 120 by a third length J3. According to some embodiments, the second length J2 is less than the third length J3, such that the second hole 128 is closer to the head portion 106 than the second hole 128 is from the second end surface 120. The position of the first hole 118 and the second hole 128 as shown may result in the passage 132 passing through both the head portion 106 and the tail portion 108 while remaining clear of a majority of the lure chamber 104. This may result in easier loading of the lure chamber 104 with a reduced chance of damaging the leader 134 during the loading process.

Some embodiments of the fishing lure 100 may include at least one scent hole 140 (e.g., formed in one or both of the first tubular sidewall 112 and the second tubular sidewall 122). Each of the at least one scent hole 140 provides passage from the lure chamber 104 (e.g., from the tail chamber 124) through the lure body 102 (e.g., through the second tubular sidewall 122) to an exterior of the fishing lure 100 (e.g., to the surrounding environment). The at least one scent hole(s) 140 may be positioned such that the passage(s) defined by each of the at least one scent hole(s) 140 remain open/unblocked in both the open configuration and the closed configuration.

The fishing lure 100 may be loaded with bait 117 that attracts fish to the fishing lure 100. "Bait" as used herein refers to any media or material placed within the lure chamber 104 to enhance the attractiveness of the fishing lure 100 to fish or other sea creatures. Bait includes, but is not limited to, food, scent emitting media, noise makers (e.g., solid objects that bump against one another), organic material, etc. The scent hole(s) 140 provide an outlet for scent, noise, or other characteristics of the bait 117 within the lure chamber 104 to more easily enter the surrounding environment (e.g., body of water) and attract fish without releasing the bait 117 from within the lure chamber 104.

According to some embodiments, one or more (up to all) of the one or more scent holes 140 may be closer to the second end surface 120 than the second hole 128 is from the second end surface 120. Thus, the one or more scent holes 140 may be between the second hole 128 and the second end surface 120 with respect to the first direction D1. The one or more scent holes 140 may be spaced radially about the second tubular sidewall 122. For example, one of the scent holes 140 may be positioned on a front surface 142 of the lure body 102 and another of the scent holes 140 may be positioned on a rear surface 144 of the lure body 102 that is opposite the front surface 142 with respect to the lure chamber 104.

Specific numbers and arrangements of the scent holes 140 may vary. However, according to some embodiments, the scent holes 140 may include a first pair of longitudinally spaced scent holes 140 (aligned such that a straight line parallel to the first direction D1 intersects both of the first pair of scent holes 140), and a second pair of laterally spaced scent holes 140 (aligned such that a straight line perpendicular to the first direction D1 intersects both of the second pair of scent holes 140). Additionally, the size of the at least one scent hole 140 may be selected based on the type of bait to be secured within the lure chamber 104. According to some embodiments, each of the at least one scent holes 140 may be larger than the second hole 128.

The second hole 128 may extend through the intermediate surface 130 of the tail portion along a first central axis 146, and each of the at least one scent holes 140 extends through the second tubular sidewall 122 along respective second central axes 148. As shown, the first central axis 146 of the second hole 128 may be non-parallel with respect to the second central axis 148 of the at least one scent hole 140.

Embodiments of the fishing lure 100 may include a connector 160 that secures the head portion 106 to the tail portion 108 in the closed configuration. For example, the fishing lure 100 may include a projection 162 and a recess 164. As shown in the illustrated embodiment, the projection 162 may be receivable within the recess 164 to transition the fishing lure to the closed configuration.

The projection 162 may extend from at least one of the first tubular sidewall 112 and the second tubular sidewall 122, and the recess 164 extends into at least one of the first tubular sidewall 112 and the second tubular sidewall 122. For example, the projection 162 may extend from either the first tubular sidewall 112 or the second tubular sidewall 122 and the recess 164 may extend into the other of the first tubular sidewall 112 and the second tubular sidewall 122. As shown, the projection 162 may extend from the second tubular sidewall 122 of the tail portion 108 and the recess 164 may extend into the first tubular sidewall 112 of the head portion 106. In some embodiments, the projection 162 and the recess 164 may be reversed, with the projection 162 extending from the first tubular sidewall 112 of the head portion 106 and the recess 164 extending into the second tubular sidewall 122 of the tail portion 108. Alternatively, the head portion 106 and the tail portion 108 may each include alternating portions of the projection 162 and the recess 164 extending from the respective portions.

Figures 12, 13:
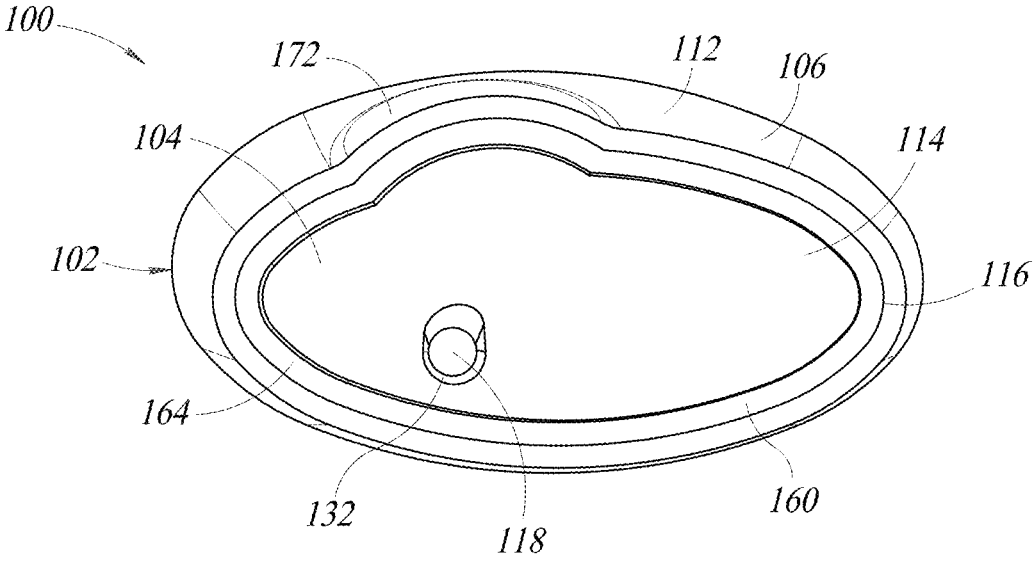
FIG. 12 is top plan view of a head portion of the fishing lure illustrated in FIG. 11.
FIG. 13 is bottom plan view of a tail portion of the fishing lure illustrated in FIG. 11.

The projection 162 and the recess 164 may have corresponding shapes such that the projection 162 is linearly translatable relative to the recess 164 to position the projection 162 within the recess 164. As shown, the projection 162 and the recess 164 may have cross-sectional shapes that correspond to cross-sectional shapes of the respective portion that the projection 162 extends from and that the recess 164 extends into. For example, the head portion 106, the tail portion 108, the projection 162, the recess 164, or any combination thereof may have an oval cross-sectional shape. As best shown in FIGS. 12 and 13, the cross-sectional shape of the head portion 106 may be defined within a plane parallel to the head opening 116, and the tail portion 108 may be defined within a plane parallel to the tail opening 126. The cross-sectional shape of the head portion 106, the tail portion 108, the projection 162, the recess 164, or any combination thereof may form a closed perimeter (e.g., a complete oval that surrounds a portion of the lure chamber 104 in the closed configuration.

The lure body 102 may include additional surface features, some of which may affect spin characteristics of the fishing lure 100 when travelling through water. The lure body 102 may include a raised portion 172 (e.g., a bump) extending radially outward from the lure body 102 along a portion of the length J1. As shown, the raised portion 172 may be cooperatively formed by both the head portion 106 and the tail portion 108. The raised portion 172 may define a portion of the passage for the leader 134 through the lure chamber 104.

Some embodiments of the lure body 102 may include a recessed portion 174 (e.g., a divot) extending radially inward toward the lure chamber 104 along a portion of the length J1. As shown, the recessed portion 174 may be formed by the second tubular sidewall 122 of the tail portion 108. The recessed portion 174 may be aligned with the raised portion 172, the second hole 128, the intermediate surface 130, or any combination thereof along the first direction D1, such that a straight line parallel to the first direction D1 intersects the recessed portion 174 and one or more of the raised portion 172, the second hole 128, and the intermediate surface 130. Accordingly, the recessed portion 174 may be positioned between the second end surface 120 and the second hole 128, as shown in the illustrated embodiment.

The projection 162 and the recess 164 may be sized such that, when in the closed configuration, the projection 162 and the recess 164 form a friction fit that resists separation of the head portion 106 from the tail portion 108. Thus, embodiments of the fishing lure 100 may be devoid of additional locking members that maintain the fishing lure 100 in the closed configuration. The projection/bump 162 and recess/divot 164 may play a role in influencing the function and action of the fishing lure 100 on the leader 134. The projection/bump 162 and recess/divot 164 allows the fishing lure 100 to "sit" on a small portion of the leader 134 and rotate tightly about the leader 134 at slow "swim" speeds. The positions of the projection/bump 162 and the recess/divot 164 and the first hole 118 and the second hole 128 may also keeps one or more hooks tight to the lure body 102 and in line with the fishing lure's rotation. This results in the fishing lure 100 being balanced and tuned for better securement to a fish when the fish strikes the fishing lure 100.

Figure 6:
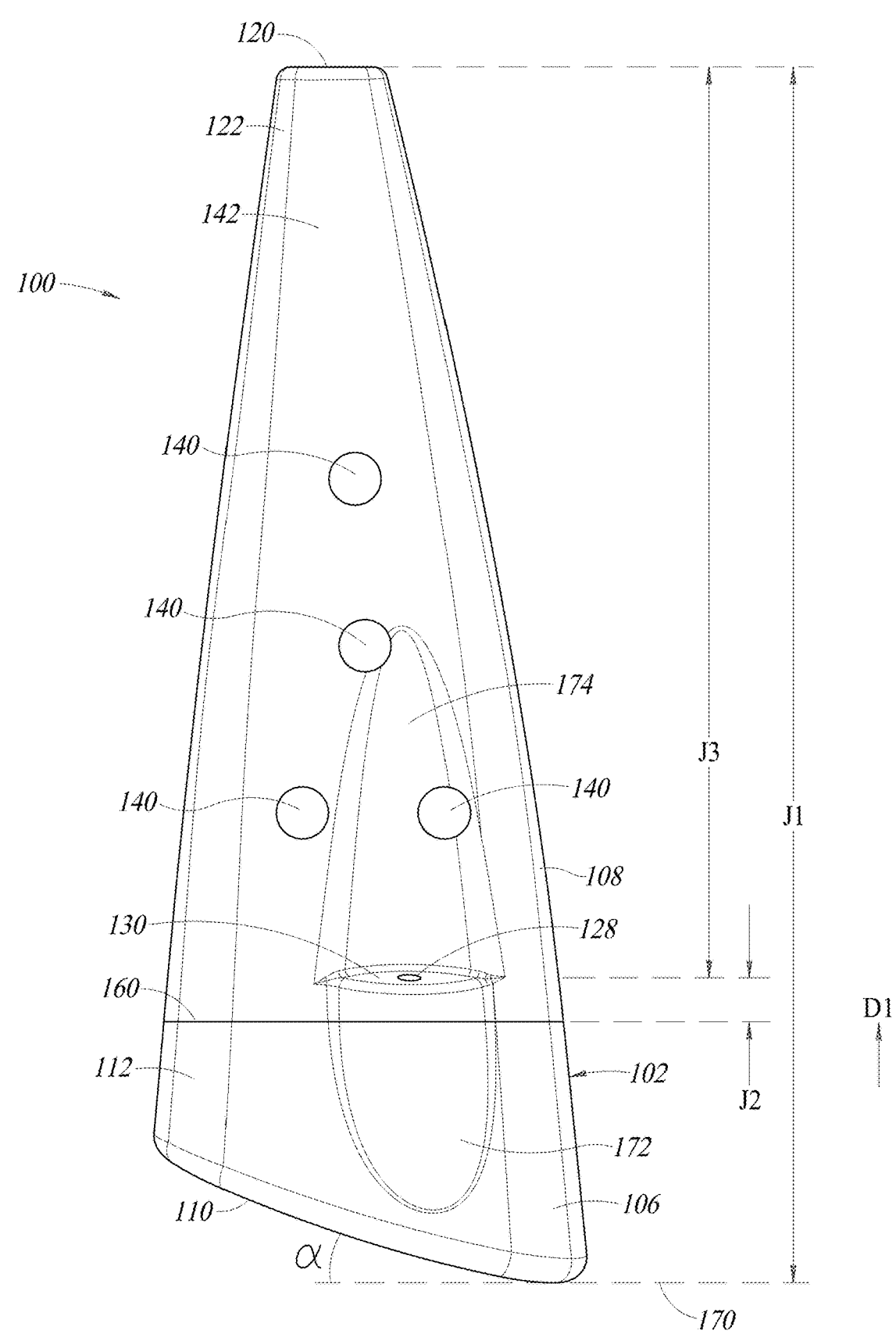
FIG. 6 is a front elevation view of the fishing lure illustrated in FIG. 4.

As best shown in FIG. 6, the first end surface 110 and the second end surface 120 may be angularly offset (e.g., non-parallel) with respect to one another. For example, the second end surface 120 may be parallel to a plane 170, and the first end surface 110 may be angularly offset from the plane 170 by an angle α. The angle α may be within a range of between about 20° and about 75°, for example within a range of between about 35° and about 60°, such as about 50°.

Figure 7:
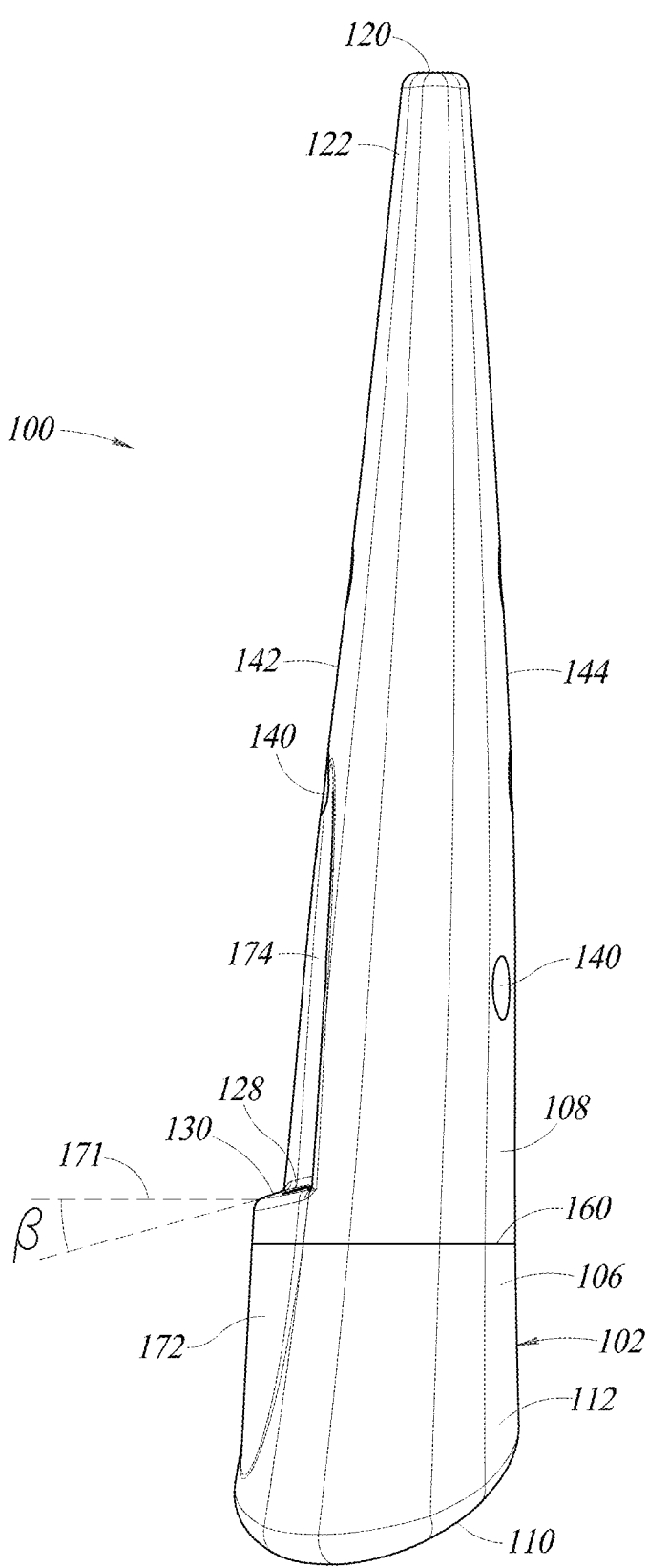
FIG. 7 is a right side elevation view of the fishing lure illustrated in FIG. 4.
Figure 8:
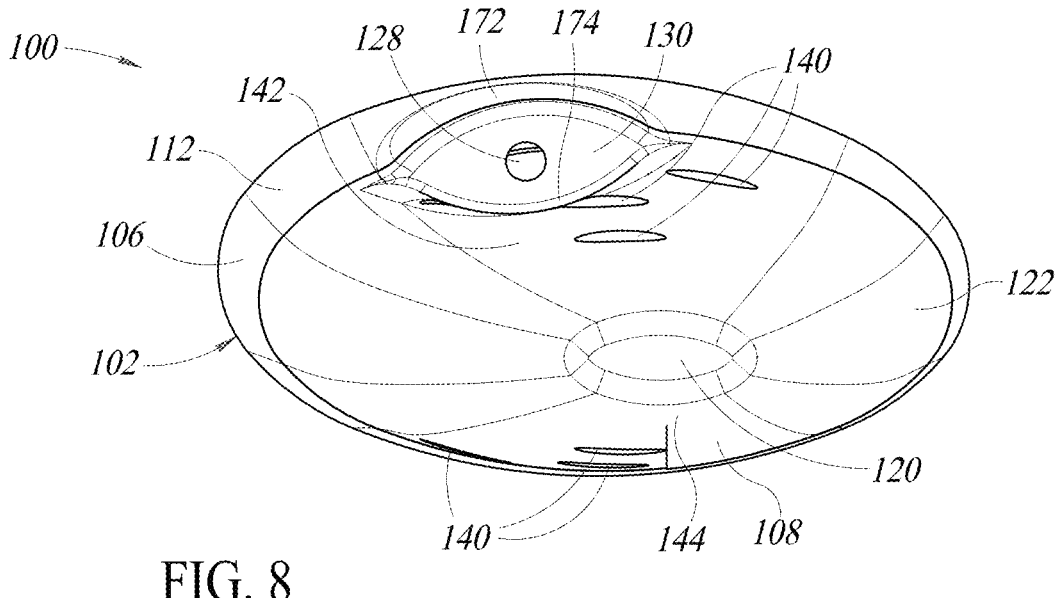
FIG. 8 is a top plan view of the fishing lure illustrated in FIG. 4.
Figure 9:
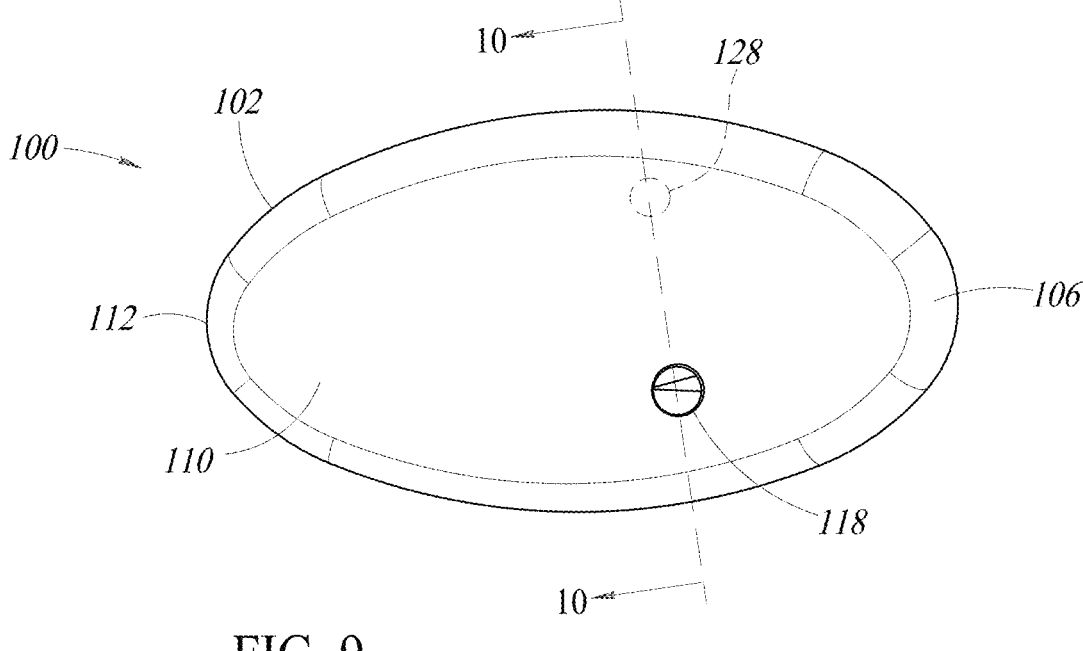
FIG. 9 is a bottom plan view of the fishing lure illustrated in FIG. 4.

The second end surface 120 and the intermediate surface 130 may parallel to one another, or angularly offset (e.g., non-parallel) with respect to one another (as best shown in FIG. 7). For example, the second end surface 120 may be parallel to a plane 171, which may be parallel to the plane 170, and the intermediate surface 130 may be angularly offset from the plane 171 by an angle β. The angle β may be smaller than the angle α (e.g., within a range of between about 0° and about 45°, for example within a range of between about 15° and about 40°, such as about 25°. Accordingly, the first end surface 110 may be angularly offset from the second end surface 120 by a greater amount than the second end surface 120 is angularly offset from the intermediate surface 130. The fishing lure 100 may include both the first end surface 110 offset by the angle α and the intermediate surface 130 offset by the angle β to form a double bevel that helps the fishing lure 100 rotate as desired in the water. Adjusting one or both of the angle α and the angle β may result in altered spin characteristics (e.g., tighter, wider, faster, or slower spin).

A method of assembling a fishing lure (e.g., the fishing lure 100) may include passing an end/a portion of a line (e.g., the leader 134) through the first hole 118 formed in a first surface (e.g., the first end surface 110) of the head portion 106 of the fishing lure 100. The method may further include passing the end/portion of the leader 134 through the second hole formed in a second surface (e.g., the intermediate surface 130) of the tail portion 108. According to the method, at least one of the head portion 106 and the tail portion 108 is moved relative to the other of the head portion 106 and the tail portion 108 (e.g., in a singular, linear direction, for example the first direction D1) while the leader 134 extends through both the first hole 118 and the second hole 128. Moving the head portion 106 and/or the tail portion 108 may form a chamber (e.g., the lure chamber 104) that is defined by and enclosed within the lure body 102 (e.g., the head portion 106 and the tail portion 108). The method may further include enclosing a portion of the leader 134 within the lure chamber 104 such that an entirety of a length of the leader 134 between the first hole 118 and the second hole 128 is within the lure chamber 104. The leader 134 may be attached to a hook 176, weights 178, or other components known for use as part of fishing.

The method may further include enclosing the bait 117 within the lure chamber 104 by transitioning the fishing lure 100 from the open configuration to the closed configuration (e.g., via the movement of at least one of the head portion 106 and the tail portion 108 relative to the other of the head portion 106 and the tail portion 108 in the singular, linear direction). The method may include transitioning the fishing lure 100 from the closed configuration to the open configuration (e.g., via movement of at least one of the head portion 106 and the tail portion 108 relative to the other of the head portion 106 and the tail portion 108 in a singular, linear direction opposite the first direction D1).

The method may further include inserting the projection 162 (e.g., extending from one of the first tubular sidewall 112 or the second tubular sidewall 122) into the recess 164 (e.g., extending into the other of the first tubular sidewall 112 or the second tubular sidewall 122). Inserting the projection 162 into the recess 164 may form a friction fit between the head portion 106 and the tail portion 108, and the friction fit may resist transitioning of the fishing lure 100 from the closed configuration to the open configuration during use.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The various embodiments described above can be combined to provide further embodiments.

Many of the methods described herein can be performed with variations. For example, many of the methods may include additional acts, omit some acts, and/or perform acts in a different order than as illustrated or described.

As used herein, "greater than" and "less than" limits may also include the number associated therewith. Stated another way, "greater than" and "less than" may be interpreted as "greater than or equal to" and "less than or equal to." It is contemplated that this language may be subsequently modified in the claims to include "or equal to."

In some embodiments, any or some of the components or steps disclosed herein may be considered optional. In some cases, the disclosed embodiments may expressly exclude any or some of the aforementioned elements or steps in this description, e.g., via claim language. For example, claim language may be modified to recite that the disclosed fishing lure and/or methods, etc., do not utilize or comprise a locking mechanism beyond the friction fit between components of the connector. Such negative limitations are contemplated, and this text serves as support for negative limitations for components, steps, and/or features.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A fishing lure comprising:
a head portion including a first end surface and a first tubular sidewall extending away from the first end surface; and
a tail portion including a second end surface and a second tubular sidewall extending away from the second end surface,
wherein the head portion is selectively couplable to the tail portion to form a closed configuration in which the head portion and the tail portion cooperatively form a lure chamber,
wherein the fishing lure in the closed configuration defines a passage that enters the lure chamber through a first hole formed in the first end surface and exits the lure chamber through a second hole formed in the tail portion, and an entirety of the passage between the first hole and the second hole remains within the lure chamber, and
wherein when in the closed configuration the second hole is closer to the head portion than the second hole is to the second end surface.

2. The fishing lure of claim 1 wherein the tail portion includes at least one scent hole formed in the second tubular sidewall that provides passage from the tail chamber to a surrounding environment, and the at least one scent hole is closer to the second end surface than the second hole is to the second end surface.

3. The fishing lure of claim 2 wherein the second hole extends through a surface of the tail portion along a first central axis, the at least one scent hole extends through the second tubular sidewall along a second central axis, and the first central axis is non-parallel with respect to the second central axis.

4. The fishing lure of claim 2 wherein the at least one scent hole includes a first scent hole and a second scent hole positioned on opposite one another with respect to the tail chamber.

5. The fishing lure of claim 1 wherein the at least one scent hole is larger than both the first hole and the second hole.

6. The fishing lure of claim 1, further comprising a projection and a recess, wherein the projection is receivable within the recess to transition the fishing lure to the closed configuration.

7. The fishing lure of claim 6 wherein the projection extends from one of the first tubular sidewall and the second tubular sidewall, and the recess extends into the other of the first tubular sidewall and the second tubular sidewall.

8. The fishing lure of claim 7 wherein the projection and the recess have corresponding shapes such that the projection is linearly translatable relative to the recess to position the projection within the recess.

9. The fishing lure of claim 8 wherein the projection and the recess are sized such that, when in the closed configuration, the projection and the recess form a friction fit that resists separation of the head portion from the tail portion.

10. The fishing lure of claim 1 wherein the second hole is formed in an intermediate surface of the tail portion, and the first end surface is angularly offset from the second end surface by a greater amount than the second end surface is angularly offset from the intermediate surface.

11. The fishing lure of claim 10 wherein the first end surface is angularly offset from the second end surface by between about 10 and 50 degrees, and the second end surface is offset from the intermediate surface by between about 0 and 10 degrees.

12. The fishing lure of claim 1 wherein the tail portion includes a divot formed by the second tubular wall and positioned between the second hole and the second end surface.

13. The fishing lure of claim 1 wherein the head portion includes a head chamber at least partially defined by the first end surface and the first tubular sidewall, the tail portion includes a tail chamber at least partially defined by the second end surface and the second tubular sidewall, and in the closed configuration the head chamber and the tail chamber cooperatively define the lure chamber.

14. A method of assembling a fishing lure, the method comprising:

passing a leader through a first hole formed in a first surface of a head portion of the fishing lure;

passing the leader through a second hole formed in a second surface of a tail portion of the fishing lure;

moving at least one of the head portion and the tail portion relative to the other of the head portion and the tail portion in a singular, linear direction, while the leader extends through both the first hole and the second hole, to form a chamber defined by and enclosed within the head portion and the tail portion;

enclosing a portion of the leader within the chamber such that an entirety of a length of the leader between the first hole and the second hole is within the chamber; and securing the leader to the fishing lure such that the leader is devoid of a portion outside the chamber between portions of the leader that are inside the chamber.

15. The method of claim 14, further comprising inserting a projection extending from a tubular sidewall of one of the head portion and the tail portion into a recess extending into a tubular sidewall of the other of the head portion and the tail portion.

16. The method of claim 14 wherein the singular, linear direction is a first direction and the method further comprises moving at least one of the head portion and the tail portion relative to the other of the head portion and the tail portion in a second singular, linear direction that is opposite the first singular, linear direction while the leader extends through both the first hole and the second hole, to open the chamber.

17. The method of claim 14, further comprising enclosing bait within the chamber by transitioning the fishing lure from an open configuration to a closed configuration.

18. The method of claim 17 wherein the moving of at least one of the head portion and the tail portion relative to the other of the head portion and the tail portion in the singular, linear direction, transitions the fishing lure from the open configuration to the closed configuration, and vice versa.

19. The method of claim 17 wherein the chamber extends along a length of the fishing lure from a first end surface of the head portion to a second end surface of the tail portion, and when in the closed configuration the second hole is closer to the head portion than the second hole is to the second end surface.

\*     \*     \*     \*     \*